United States Patent
Gagne et al.

(10) Patent No.: US 8,791,679 B2
(45) Date of Patent: Jul. 29, 2014

(54) SELF-SUSTAINING, HIGH VOLTAGE TOLERANT POWER SUPPLY

(75) Inventors: Nickole Gagne, Saco, ME (US); Gregory Maher, Cape Elizabeth, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 319 days.

(21) Appl. No.: 13/210,217

(22) Filed: Aug. 15, 2011

(65) Prior Publication Data

US 2012/0249116 A1    Oct. 4, 2012

Related U.S. Application Data

(60) Provisional application No. 61/470,233, filed on Mar. 31, 2011.

(51) Int. Cl.
*G05F 1/40* (2006.01)

(52) U.S. Cl.
USPC .......................................... 323/283; 323/271

(58) Field of Classification Search
CPC ..... H01F 2038/006; H02J 1/102; H02M 3/00; H02M 3/28; H02M 3/33592; H02M 7/003; H02M 1/088; H02M 2001/0012; H02M 2001/0074; H02M 2001/008; G05F 1/10
USPC ......... 327/166, 309, 321, 333, 391, 437, 318; 361/56, 58, 88, 89, 91.1, 111, 118; 326/30, 24, 86, 87, 71, 90, 121; 323/282–290, 311, 313, 315
See application file for complete search history.

(56) References Cited

U.S. PATENT DOCUMENTS

| | | | |
|---|---|---|---|
| 4,737,463 A * | 4/1988 | Bhattacharjee et al. | 436/2 |
| 5,173,847 A * | 12/1992 | Suzuki | 363/21.14 |
| 5,978,192 A * | 11/1999 | Young et al. | 361/56 |
| 6,169,672 B1 * | 1/2001 | Kimura et al. | 363/56.05 |
| 6,222,355 B1 * | 4/2001 | Ohshima et al. | 323/282 |
| 6,255,886 B1 * | 7/2001 | Manning | 327/325 |
| 6,643,151 B1 * | 11/2003 | Nebrigic et al. | 363/59 |
| 6,791,373 B2 | 9/2004 | Oyama | |
| 7,023,248 B2 | 4/2006 | Ott | |
| 7,430,100 B2 * | 9/2008 | Bhattacharya et al. | 361/91.1 |
| 7,501,849 B2 * | 3/2009 | Perisetty | 326/15 |
| 7,652,945 B2 | 1/2010 | Chu et al. | |
| 7,705,483 B2 * | 4/2010 | Ozawa et al. | 307/31 |
| 7,791,324 B2 | 9/2010 | Mehas et al. | |
| 8,279,568 B2 * | 10/2012 | Stultz et al. | 361/87 |
| 8,456,784 B2 * | 6/2013 | Stockinger et al. | 361/56 |

* cited by examiner

*Primary Examiner* — Rajnikant Patel
(74) *Attorney, Agent, or Firm* — Grossman Tucker Perreault & Pfleger PLLC

(57) ABSTRACT

A power supply system is provided that provides voltage clamping capabilities to provide over voltage protection to circuit elements and circuit systems. The power supply includes isolation mechanisms that generate a regulated power supply that is independent of an input power source. Voltage addition/multiplication techniques may be utilized to generate a reference voltage, from the regulated power supply, that is capable of setting a maximum voltage on a clamped power supply. The power supply system may operate without input from other circuits/systems associated with an integrated circuit.

18 Claims, 5 Drawing Sheets

SELF-SUSTAINING, HIGH VOLTAGE TOLERANT POWER SUPPLY

This application claims the benefit of U.S. Provisional Application No. 61/470,233, filed Mar. 31, 2011, which is incorporated by reference herein in its entirety.

FIELD

The present disclosure relates to a power supply, and more particularly, to a self-sustaining, high voltage tolerant power supply.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides a power supply system that generates a clamped power supply and provides over voltage protection. The power supply receives an input power source (e.g., bus power supply, etc.) and generates a controlled clamped power supply capable of supplying power to a plurality of circuit elements, e.g. circuit elements associated with an integrated circuit (IC). Overvoltage protection of the present disclosure includes clamp circuitry that generates the clamped power supply as the input power source ramps up to full value. After the input power source is ramped to full value, charge pump mechanisms are utilized to generate a set point control voltage, which, in turn, controls a high voltage switch device so that the clamped power supply remains within a selected tolerance range while protecting the clamped power supply (and hence devices coupled thereto) from spikes or surges on the input power source. The power supply of the present disclosure may be included as an input power conditioning stage of an integrated circuit (IC). Advantageously, in some embodiments, the power supply system of the present disclosure is self-sustaining, meaning that the power supply may operate without input from other sources (e.g., over voltage protection circuitry, digital core circuitry, etc.) associated with the IC.

Figure 1:
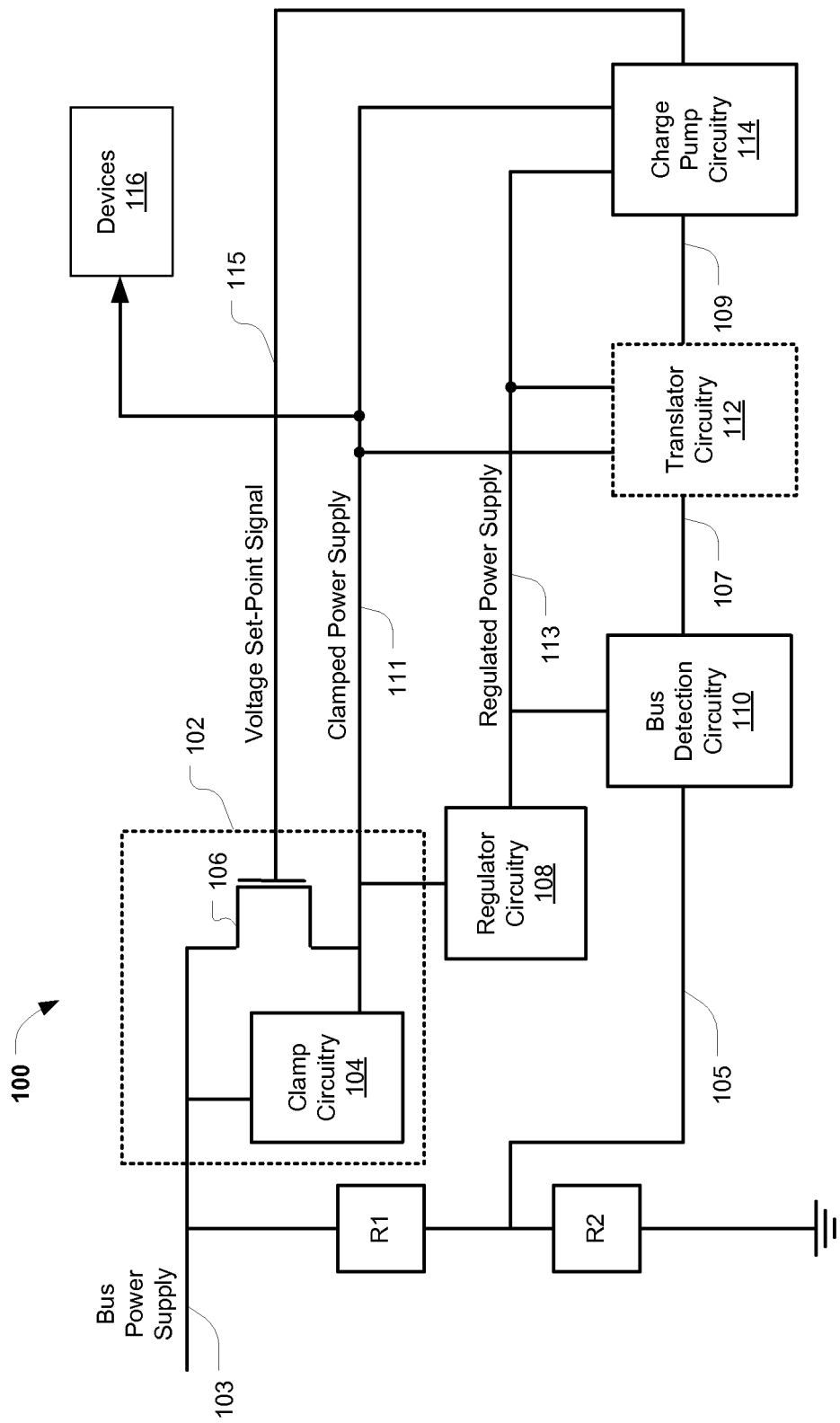
FIG. 1 illustrates a power supply system consistent with various embodiments of the present disclosure.

FIG. 1 illustrates a power supply system 100 consistent with various embodiments of the present disclosure. The power supply system 100 depicted in FIG. 1 may be included with, or form part of, a general-purpose or custom integrated circuit (IC) such as a semiconductor integrated circuit chip, system on chip (SoC), etc. As a general overview, the power supply system 100 includes high voltage tolerant circuitry 102 configured to generate a clamped power supply voltage 111 from an input bus power supply 103. The clamped power supply 111, in some embodiments, may be used as an internal power supply for one or more devices 116 coupled to the clamped power supply 111. The devices 116, coupled to the clamped power supply 111, may include, for example, one or more circuits and/or circuitry systems associated with an IC. Thus, the clamped power supply 111, at least in part, may be utilized as an internal power supply to an IC.

The input bus power supply 103 may include, for example, an input bus power supply such as a VBUS power supply (as may be associated with a universal serial bus (USB), mini universal serial bus (MUS), etc.). The input bus power supply 103 may generally have two distinct periods: a ramp-up period during which the bus power supply is ramping up to a full value, and a fully-on period during which the bus power supply is capable of supplying power as intended. The high voltage tolerant circuitry 102 includes clamp circuitry 104 and high voltage switch circuitry 106. The clamp circuitry 104 is configured to receive an input bus power supply 103. For a selected voltage range of a ramp-up period of the power supply 103 (for example, during initialization of the bus, power-on reset, etc.), the clamp circuitry 104 is configured to generate the clamped power supply 111. The clamp circuitry 104 is also configured to limit the voltage of clamped power supply 111 to a predefined value, during the selected voltage range of the ramp-up period, thus providing over voltage protection for one or more devices 116 coupled the clamped power supply 111. Once the input bus power source 103 has ramped above a predetermined threshold, the high voltage switch circuitry 106 provides a predetermined voltage on the clamped power supply 111 and also provides high voltage protection for the clamped power supply 111, as will be described in greater detail below.

The power supply system of FIG. 1 may also include regulator circuitry 108, bus detection circuitry 110, charge pump circuitry 114, and translator circuitry 112. Regulator circuitry 108 is configured to generate a regulated power supply 113, based on the clamped power supply 111. The regulated power supply 113 may be used to power and/or enable the bus detection circuitry 110, charge pump circuitry 114 and/or translator circuitry 112, as will be described in greater detail below. In at least one embodiment, the regulator circuitry 108 is configured to generate a voltage level on the regulated power supply 113 that is less than a voltage level on the clamped power supply 111. Advantageously, the regulator circuitry 108 is configured to generate a regulated power supply 113 that is independent of the bus power supply 103, thus isolating the regulated power supply 113 from over voltage conditions on the bus power supply 103.

The power supply system of FIG. 1 may also include voltage divider circuitry, represented as R1 and R2. The ratio of R1/R2 may be selected to generate a divided voltage signal 105 that is indicative of, or proportional to, the bus power supply 103, but generally less than the bus power supply 103. The divided voltage signal 105 may ramp up during the ramp-up period of the bus power supply 103, and then remain fully on when the bus power supply 103 is fully on, but generally with a lower voltage than the voltage of the bus power supply 103. The bus detection circuitry 110 is configured to receive the divided voltage signal 105 and generate a control signal 107 indicative of the state of the bus power supply 103, e.g., generate a control signal 107 indicative of whether the bus power supply 103 is in the ramp-up period or the fully on period. The bus detection circuitry 110 may be powered by the regulated power supply 113.

In one embodiment, if the divided voltage signal 105 is below a predetermined threshold during the ramp-up period of the bus power supply 103, the bus detection circuitry 110 is configured to generate the control signal 107 having a first (low) value, and when the divided voltage signal 105 exceeds the predetermined threshold, the control signal 107 has a second (high) value. In one embodiment, since the regulated power supply 113 supplies power to the bus detection circuitry 110, the first value of the control signal 107 may be approximately zero volts, while the second value of the control signal 107 may be approximately equal to the voltage of the regulated power supply 113.

The charge pump circuitry 114 may include logic circuitry that is susceptible to increased threshold current (Icct). For example, the charge pump circuitry 114 may include transistors (e.g., inverter circuitry, NAND/NOR/AND/OR gate circuitry, PMOS/NMOS pair circuitry, etc.) that may draw increased Icct, or suffer from simultaneous conduction of logic gates, if a gate voltage for such transistors is less than a supply voltage. Accordingly, one embodiment of the power supply system 100 may also include translator circuitry 112 configured to translate the control signal 107 to a translated control signal 109. For example, the voltage of the control signal 107 may be translated up so that the translated control signal 109 has a value approximately equal to the clamped power supply 111. Of course, the translator circuitry 112 may be omitted if, for example, the charge pump circuitry 114 is configured to avoid an increase in Icct, in which case the control signal 107 may be utilized by the charge pump circuitry 114.

The charge pump circuitry 114 is configured to generate a voltage set point signal 115 based on the state of the control signal 107 (or translated control signal 109) and based on the regulated power supply 113. Generally, the charge pump circuitry operates as a voltage adder and/or voltage multiplier of the regulated power supply 113. In one embodiment, the voltage set point signal 115 is a selected multiple of the regulated power supply 113 (e.g., signal 115 has a voltage value of 2 times the voltage of the regulated power supply 113). The voltage set point signal 115 is used to control the conduction state of the high voltage switch circuitry 106. Also, since the voltage set point signal 115 is generated as a function of the regulated power supply 113, the operation of the charge pump circuitry 114 and the voltage set point signal 115 may be independent of the bus power supply 103, so that the voltage set point signal 115 is isolated from variations on the bus power supply 103.

High voltage switch circuitry 106 may be coupled between the bus power supply 103 and the clamped power supply 111. In one embodiment, the switch circuitry 106 may include a high voltage transistor device, e.g., high voltage NMOS device, coupled between the bus power supply 103 and the clamped power supply 111 in a source follower configuration so that the source voltage is limited to the gate voltage minus a threshold voltage (Vt). The high voltage tolerance capabilities of the high voltage switch circuitry 106 can be determined by, for example, the expected maximum voltage level of the bus power supply 103 and/or transient voltage spikes/surges up to a specified voltage level (e.g., 28V, 40V, etc.). The physical high voltage limitation of the high voltage switch circuitry 106 may be generally determined by certain semiconductor manufacturing tolerances that require a not-to-exceed voltage specification.

Accordingly, and in operation, as the bus power supply 103 is ramping up, the clamp circuitry 104 in parallel with the high voltage switch circuitry 106 may operate to eliminate over voltage conditions appearing on the bus power supply 103, and thus provide a stable and high voltage tolerant clamped power supply 111. Once the bus power supply 103 has exceeded a selected threshold, the regulated power supply 113 may be generated that is independent of the bus power supply 103, and the charge pump circuitry 114 may generate the voltage set point signal 115, based on the regulated power supply 113 and independently of the bus power supply 103, to control the conduction state of the high voltage tolerant switch device 106. The power supply system 100 achieves high voltage tolerance by coupling the voltage set point signal 115, generated by the charge pump circuitry 114, to the gate of the high voltage tolerant switch device 106. The voltage set point signal 115 may control the conduction of the switch circuitry 106 (e.g., linear mode conduction) so that the clamped power supply 111 is based on the voltage set point signal 115 and a threshold voltage (Vt) of the switch circuitry 106.

Operating in the linear mode and assuming an over voltage condition on the bus power supply 103, the drain to source voltage conduction of switch 106 may be limited to the voltage set point signal 115 minus a Vt, and the switch 106 may be configured to cut off voltage levels on the bus power supply 103 that exceed the voltage set point signal 115. The charge pump circuitry 114 may therefore be configured to generate the voltage set point signal 115 as a function of the regulated power supply 113, and the Vt of the switch 106, so the clamped power supply 111 does not exceed the voltage tolerance of the devices 116 coupled thereto and in some embodiments, includes a margin of error that is within the operational limits of devices 116 coupled to the clamped power supply 111. In addition, by controlling the voltage set point signal 115, the nominal voltage level of the clamped power supply 111 may be controlled. For example, certain devices (e.g., transistors, etc.) may require a not-to-exceed voltage of Y, but the normal voltage of the bus power supply 103 may have a nominal voltage of Y+% Y. Even if % Y is relatively small, this increase in supply voltage may be incompatible with certain devices that cannot tolerate any voltage greater than Y. Thus, the clamped power supply 111 may be set according to the manufacturing tolerances of devices 116 coupled thereto.

Thus, in one embodiment of the present disclosure the clamp circuitry 104 and the switch circuitry 106 may operate in parallel to provide overvoltage clamping capabilities, as well maintaining the clamped power supply 111 within tolerable limits. For example, while the power supply bus 103 is ramping up, and before the bus power supply 103 has exceeded a predetermined threshold, the charge pump circuitry 114 may operate to pull the voltage set point signal 115 up (as the regulated power supply 111 ramps up). Thus, during at least a portion of the ramp up period, the gate of the switch circuitry 106 may be biased to approximately the voltage level of the regulated power supply, and the source of the switch circuitry 106 may be limited by voltage level of the regulated power supply 113. If, during this portion of the ramp up period, an overvoltage condition occurs on the bus power supply 103, the source voltage of the switch circuitry 106 may be limited by the voltage set point signal 115. Thus, in general, the least resistive path between the switch circuitry 106 and the clamp circuitry 104 will dominate circuit performance, since both are in parallel between the bus power supply 103 and the clamped power supply 111. However, since both circuits provide over voltage protection, the protection of the clamped power supply 111 during all periods of operation may be maintained.

Of course, in another embodiment, the charge pump circuitry 114 may be configured to keep the switch circuitry 106 in a non-conducting state while the bus power supply 103 remains below a predetermined threshold. In such an embodiment, the clamp circuitry 104 may be configured to provide primary overvoltage protection for the clamped power supply 111 while the bus power supply 103 remains below a predetermined threshold.

Figure 2:
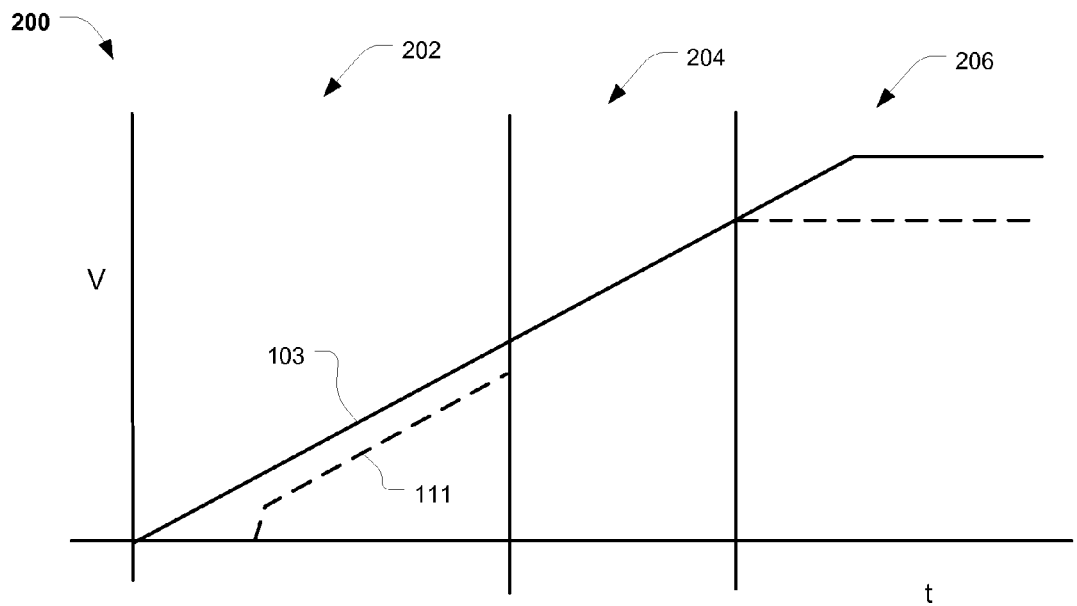
FIG. 2 illustrates a signal plot of the bus power supply and the clamped power supply consistent with one embodiment of the present disclosure.

Some advantages of the power supply system 100 are depicted in FIG. 2. With continued reference to FIG. 1, FIG. 2 illustrates a signal plot 200 of the bus power supply 103 and the clamped power supply 111 consistent with one embodiment of the present disclosure. The signal plot 200 of FIG. 2 is generally depicted as arbitrary units of voltage (V) verses time (t). In a first time period of operation 202, during a ramp up period of the bus power supply 103 (i.e., before the voltage of the bus power supply 103 reaches a predetermined threshold), the clamped power supply 111 (depicted in broken lines) ramps up in a similar fashion, but, depending on the configuration of the clamp circuitry 104, may generally rise with a level shifted voltage as compared with power supply 103 so that the clamped power supply 111 is clamped to a voltage that is less than or equal to the bus power supply 103. During this time period 202, the clamp circuitry 104 is configured to clamp over voltage conditions on the bus power supply 103 to provide high voltage tolerance for the clamped power supply 111. In addition to the clamp circuitry 104, the high voltage switch circuitry 106 may conduct in parallel during this time period 202. As the clamped power supply 111 and regulated power supply 113 ramp up, the gate of the high voltage switch device 106 also ramps up. The high voltage switch device 106 configured as a source follower may limit the source voltage to the gate voltage minus a Vt. During this time period 202, the gate voltage may not exceed the regulated power supply 113, thus limiting the high voltage switch device 106 output (taken from the source) and providing over voltage tolerance to the clamped power supply 111. The clamp circuitry 104 and the high voltage switch circuitry 106 are both configured to provide over voltage tolerance to the clamped power supply 111 and may be used in parallel during period 202.

Once the voltage of the bus power supply 103 reaches a selected threshold voltage, depicted at the beginning of a second time period of operation 204, the control signal 107 and/or 109 is asserted once the bus power supply 103 exceeds the selected threshold, and the charge pump circuitry 114 generates the voltage set point signal 115 to control the switch circuitry 106. The high voltage tolerant switch device 106, operating in linear mode, may act as a voltage controlled resistor and short the bus power supply 103 to the clamped power supply 111. During this time period 204, while the bus power supply 103 continues to ramp up, the switch circuitry 106 protects the clamped power supply 111 from over voltage conditions on the bus power supply 103. As the voltage of the bus power supply 103 continues to increase to an over voltage condition, the voltage on the clamped power supply 111 will remain at or below the voltage set point signal 115 minus a Vt, as shown in the third time period of operation 206. Thus, the clamped power supply 111 provides a high voltage tolerant supply voltage during a ramp up period of the bus power supply 103 (period 202) and is clamped to a selected low voltage value during a high voltage period on the bus power supply 103 (period 206).

Figure 3:
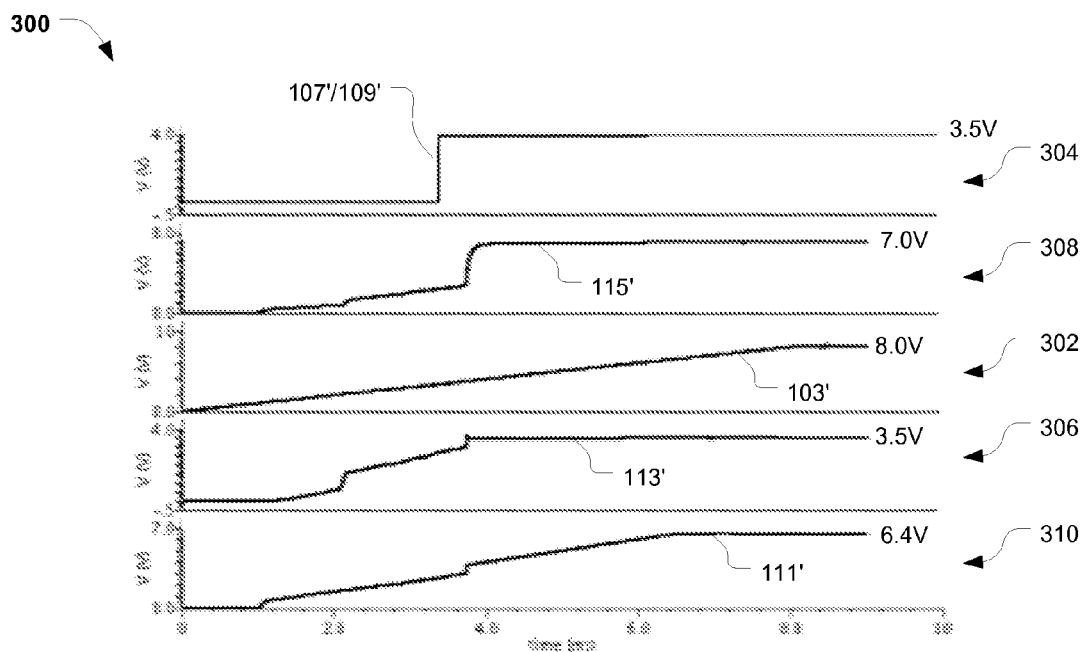
FIG. 3 illustrates signal plots of various signals of the power supply system consistent with one embodiment of the present disclosure.

A specific example of the power supply system 100 of the present disclosure is illustrated in FIG. 3. With continued reference to FIG. 1, FIG. 3 illustrates signal plots of various signals of the power supply system 100 consistent with one embodiment of the present disclosure. The signal plots of this embodiment are illustrated as voltage (V) verses time (t in ms). It is assumed for this example that the bus power supply 103' is a VBUS power supply compliant with a Universal Serial Bus (USB) specification and/or a Mini-Universal Serial Bus (MUS) specification having a nominal fully on voltage of 4.0 Volts. Plot 302 depicts the VBUS power supply 103' ramping up in an overvoltage condition, in this example, a voltage value of 8.0 Volts. Plot 304 depicts the control signal 107' and/or 109'. The predetermined threshold for the control signal 107'/109' is approximately 3.5 Volts, thus when VBUS 103' exceeds this threshold, the control signal 107'/109' asserts High. Once the control signal 107'/109' asserts High, the regulator circuitry 108 generates a 3.5 Volt regulated power supply 113' (plot 306), and the charge pump circuitry 114 generates a 7.0 Volt voltage set point signal 115' (plot 308). Since the voltage set point signal 115' is a function of the regulated power supply 113', in this example the charge pump circuitry 114 is configured to multiply voltage of the regulated power supply 113' by 2 (i.e., 2×) to generate the desired/required voltage level of the voltage set point signal 115'. In this example, the threshold voltage (Vt) of the switch 106 is approximately 0.6 Volts. The voltage set point signal 115' controls the conduction of the switch 106 such that the switch 106 sets the voltage of the clamped power supply 111 to the voltage of the voltage set point signal 115' minus the threshold voltage (Vt). Since the voltage set point signal has a maximum of 7.0 Volts, the maximum voltage of the clamped power supply 111 is therefore approximately 6.4 Volts.

Figure 4:
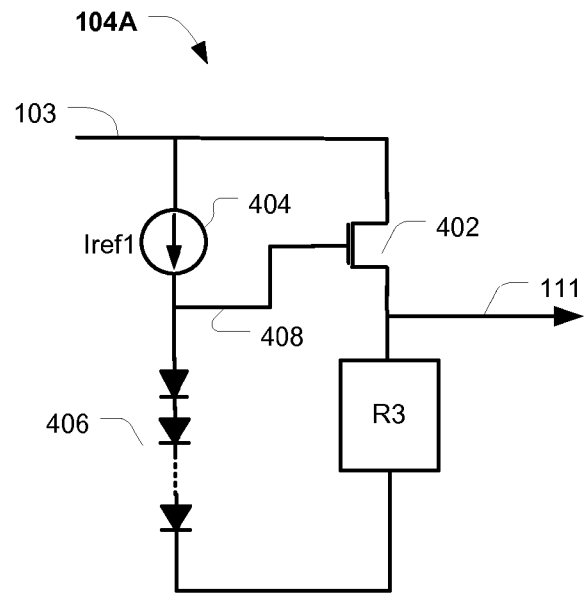
FIG. 4 illustrates a circuit example of clamp circuitry consistent with one embodiment of the present disclosure.

FIG. 4 illustrates a circuit example of clamp circuitry 104A consistent with one embodiment of the present disclosure. With continued reference to FIG. 1, the clamp circuitry 104A of this example is configured to generate the clamped power supply 111 while the bus power supply 103 is ramping up. In addition, the clamp circuitry 104A of this embodiment is configured to provide over voltage tolerance for over voltage conditions (e.g., spikes, surges, etc.) on the bus power supply 103, thus protecting the clamped power supply 111 from such conditions during a ramp up period of the bus power supply 103. The clamp circuitry 104A of this example includes a high voltage tolerant switch device 402 (e.g., NMOS device) and control circuitry that includes current source circuitry 404 configured to generate a voltage reference 408. The measure of over voltage protection may be based on the characteristics of the switch device 402, e.g., a "larger" device may offer greater over voltage protection than a "smaller" device. Thus, the size of the switch device 402 may be selected based on, for example, an expected over voltage value and/or a tolerance that may be specified by devices 116 coupled to the clamped power supply 111. The control circuitry is configured to generate a voltage reference 408 that may control the conduction of the switch device 402 so that the clamped power supply 111 is based on the voltage reference 408 and a Vt of the switch device 402. In one example, Iref1 404 and the diode stack 406 are selected to generate a voltage reference 408 so that the switch device 402 operates in a saturation mode. The switch 402 may be coupled to the bus power supply 103 and configured as a source follower, with the clamped power supply 111 taken at the source of the switch 402. Thus, voltage level of the clamped power supply may be expressed as the voltage reference 408 minus a Vt.

To provide over voltage protection for the clamped power supply 111, the clamped power supply 111 (taken at the source of the switch 402) may be proportional to the voltage reference 408 minus a Vt of switch 402. As stated, the circuit 104A operates with or without the high voltage switch circuitry 106 conducting in parallel, to generate the clamped power supply 111 during a ramp up period of the bus power supply 103. Once the bus power supply 103 exceeds a selected threshold, the charge pump circuitry 114 generates the voltage set point signal 115 to control the switch circuitry 106. The voltage set point signal 115 is set to a value that restricts the clamped power supply 111 in an over voltage condition on the bus power supply 103, thus providing over voltage protection. The value of the voltage set point signal 115 also reduces the drain to source on resistance (Rdson) of the high voltage switch device 106. The reduction in Rdson, allows the high voltage switch device 106 to become the least resistive path and it essentially shorts out the clamp circuitry 104A. Thus, to reduce or eliminate the effects of circuit 104A once the bus power supply 103 exceeds a selected threshold, the overall resistance value of switch 402 may be selected to be greater than the resistance of high voltage switch device 106, so that once the high voltage switch device 106 is enabled, the voltage of the clamped power supply 111 is largely based on the operations of high voltage switch device 106, rather than circuit 104A.

Figure 5:
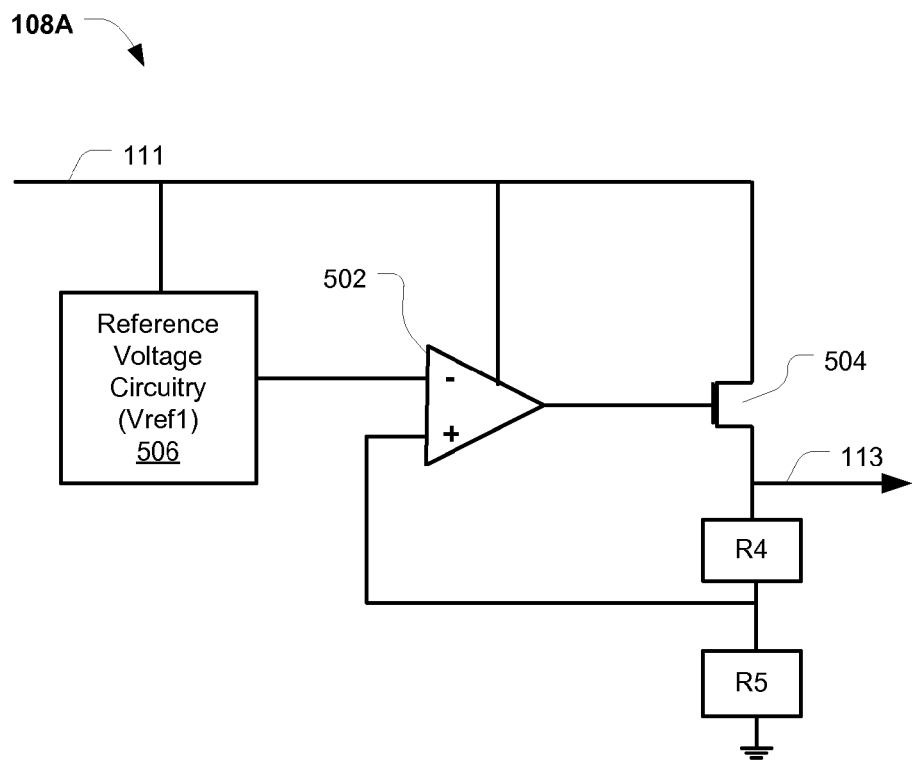
FIG. 5 illustrates a circuit example of regulator circuitry consistent with one embodiment of the present disclosure.

FIG. 5 illustrates a circuit example of regulator circuitry 108A consistent with one embodiment of the present disclosure. With continued reference to FIG. 1, the regulator circuitry 108A of this example is configured to generate the regulated power supply 113 based on the clamped power supply 111. The regulator circuitry 108A of this example includes amplifier circuitry 502 having a positive terminal coupled in a feedback arrangement with the output of the amplifier 502, so that the output of the amplifier circuitry 502 tracks an input on a negative terminal of the amplifier circuitry 502. Circuitry 108A also includes switch circuitry 504 that is coupled to the clamped power supply 111 and controlled by the output of the amplifier 502. Reference voltage circuitry 506 is configured to generate a reference voltage (Vref1) as the input at the negative terminal of the amplifier 502. Thus, switch 504 may be controlled by the amplifier 502 to operate in a linear mode so that the feedback voltage (taken between the voltage divider of resistor R4 and resistor R5) remains substantially equal to Vref1 506.

The switch 504 may be coupled to the clamped power supply 111 and configured as a source follower, with a resistive load R4/R5 providing a bias to the switch 504 in source follower mode. The switch 504 and the load R4/R5 operate as a voltage divider, with the regulated power supply 113 taken at the source of the switch 402. The values of Vref1, R4 and R5, and the gain of the amplifier 502 may be selected to generate a desired voltage level on the regulated power supply 113, and since the operations of the charge pump circuitry 114 (FIG. 1) may based on the voltage level of the regulated power supply 113, the values of Vref1, R4 and R5, and the gain of the amplifier 502 may be selected so that the charge pump circuitry 114 generates a desired voltage on the voltage set point signal 115.

In addition, so that circuitry 108A may operate independently of external reference signals (e.g., reference signals from a digital core of an IC), the reference voltage circuitry 506 may include bandgap reference circuitry configured to generate Vref1 as a temperature compensated bandgap reference voltage based solely on the clamped power supply 111.

Since the clamped power supply 111 is isolated from the bus power supply 103, the regulated power supply 113 may be independent of the bus power supply 103.

Figure 6:
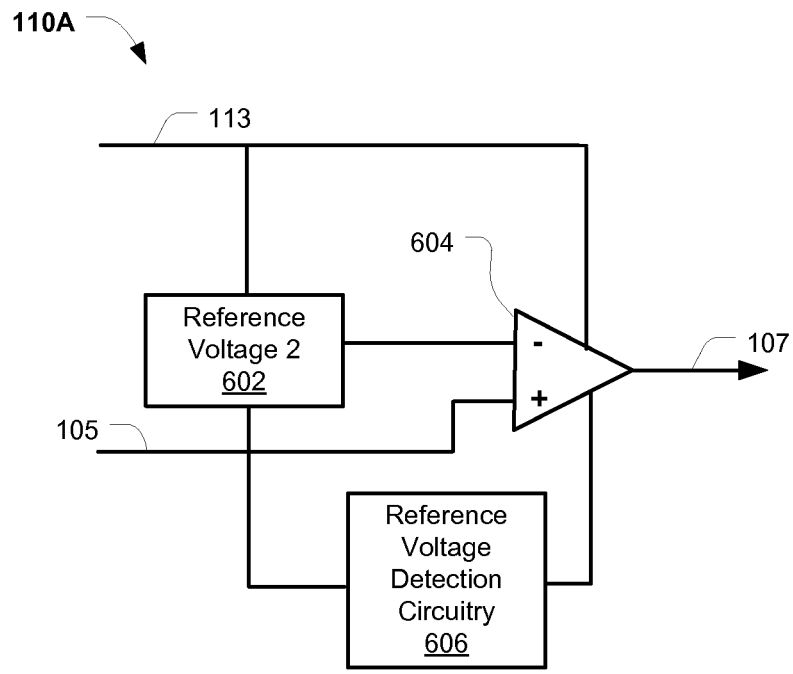
FIG. 6 illustrates a circuit example of bus detection circuitry consistent with one embodiment of the present disclosure.

FIG. 6 illustrates a circuit example of bus detection circuitry 110A consistent with one embodiment of the present disclosure. With continued reference to FIG. 1, the bus detection circuitry 110A of this example is configured to detect the voltage level of the bus power supply 103 and generate the control signal 107. The control signal 107, as discussed above, is generally a signal indicative of when the voltage of the bus power supply 103 (as represented by the divided voltage signal 105) crosses a selected threshold. The bus detection circuitry 110A of this example includes a comparator 604 configured to compare the divided voltage signal 105 to a reference voltage (Vref2) generated by reference voltage circuitry 602. If signal 105 exceeds Vref2, the comparator 604 may generate valid control signal 107 having a voltage level approximately equal to the voltage of the regulated power supply 113. If signal 105 is below Vref2, the output 107 of the comparator 604 may be approximately 0 volts (or some other reference potential). Circuitry 110A may also include reference voltage detection circuitry 606 configured to detect the voltage level of Vref2, and to generate an enable signal when Vref2 exceeds a selected threshold. The enable signal generated by the voltage detection circuitry 606 may be used to enable/disable the comparator 604, thus reducing or eliminating any glitching that could occur during ramp up when Vref2 generated by reference voltage circuitry 602 momentarily exceeds signal 105, which is a common event for a number of analog references including bandgap references. As with reference voltage circuitry 506 (described above), the reference voltage circuitry 604 may include bandgap reference circuitry configured to generate Vref1 as a temperature compensated bandgap reference voltage based solely on the regulated power supply 113.

Figure 7:
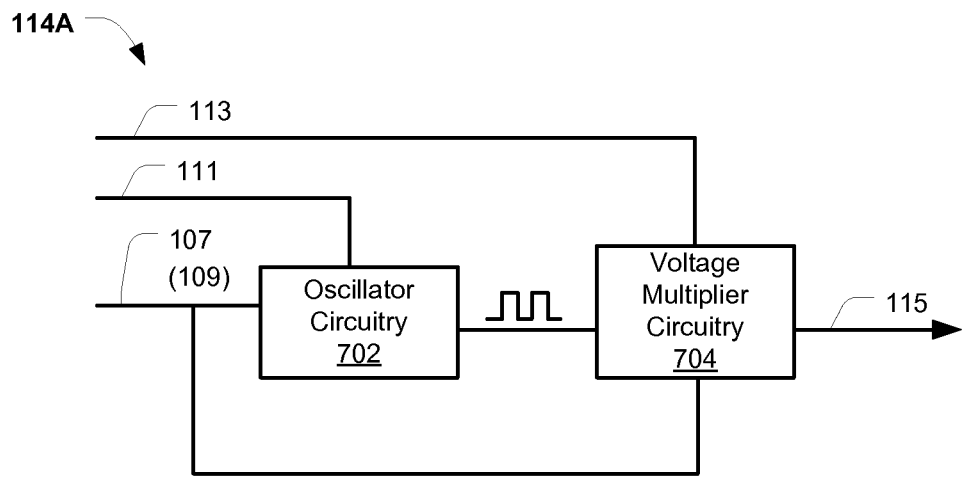
FIG. 7 illustrates a circuit example of charge pump circuitry consistent with one embodiment of the present disclosure.

FIG. 7 illustrates a circuit example of charge pump circuitry 114A consistent with one embodiment of the present disclosure. With continued reference to FIG. 1, the charge pump circuitry 114A of this example is configured to multiply the voltage of the regulated power supply 113 and generate the voltage set point signal 115. The charge pump circuitry 114A of this example includes oscillator circuitry 702 and voltage multiplier circuitry 704. The oscillator circuitry 702 is configured to generate a clock signal, and is enabled by the control signal 107 or 109. The clamped power supply 111 supplies power to the oscillator circuitry 702, and thus, as discussed above, if the voltage level of control signal 107 is less than the voltage level of the clamped power supply 111, translator circuitry 112 (FIG. 1) may be used to boost the level of the control signal 107 to a higher voltage control signal 109. The voltage multiplier circuitry 704 is also enabled by signal 107 or 109. To generate the voltage set point signal 115, the voltage multiplier circuitry 704 may use edges of the clock signal to switch between capacitors (not shown) to increase the voltage of the regulated power supply 113.

The voltage multiplier circuitry 704 may be configured to multiply the power supply 113 by a set multiplication factor (e.g., 1.7×, 2×, etc.), or the voltage multiplier circuitry 704 may be programmable to permit changes in the multiplication factor. In addition, using the voltage level of the clamped power supply 111 as the controlling factor, the voltage multiplier circuitry 704 may be configured to dynamically adjust the multiplication factor to accommodate changes in the regulated power supply 113 (to this end, the circuitry 704 may be configured to receive feedback information of the voltage of the clamped power supply 111).

Figure 8:
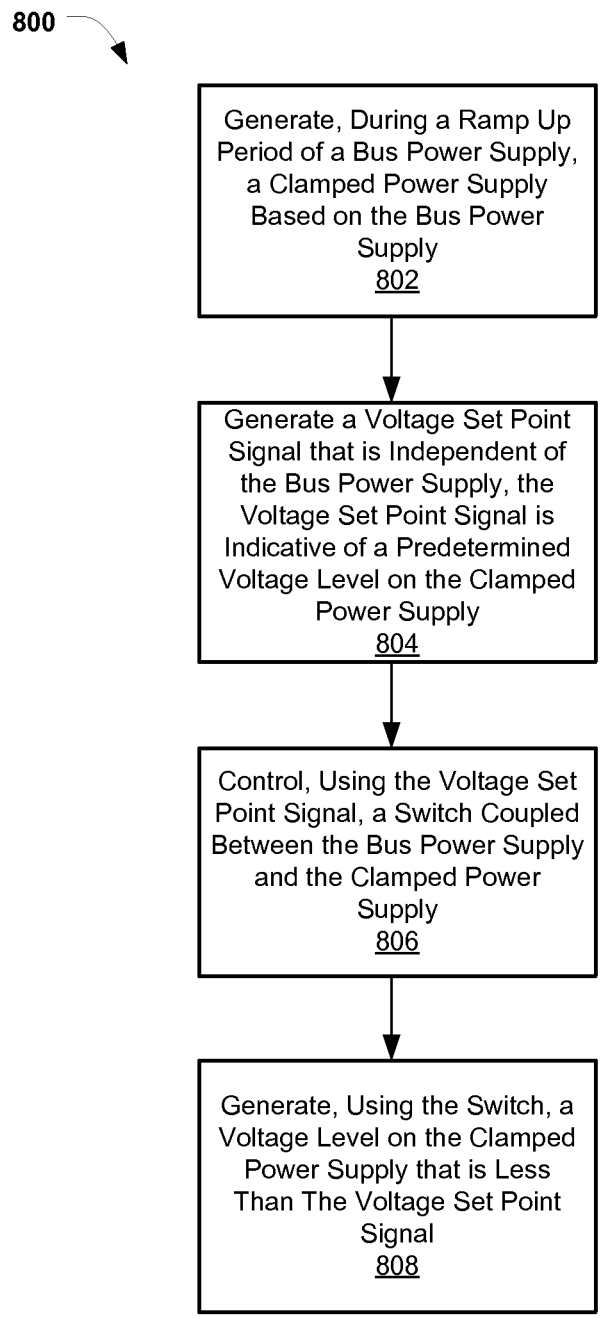
FIG. 8 illustrates a flowchart of operations according to one embodiment of the present disclosure.

While FIGS. 4-7 depict certain exemplary circuit topologies that may be utilized according to the teachings of the present disclosure, it will be recognized that many alternatives and/or modifications may be apparent to those skilled in the art, and all such alternatives and/or modifications that satisfy the above-described functionality and/or purpose are deemed within the scope of the present disclosure. Accordingly, FIG. 8 illustrates a flowchart 800 of operations consistent with one embodiment of the present disclosure. Operations of this embodiment may include generating, during a ramp up period of a bus power supply, a clamped power supply based on the bus power supply 802. Operations may also include generating a voltage set point signal that is independent of the bus power supply, where the voltage set point signal is indicative of a predetermined voltage level on the clamped power supply 804. Operations of this embodiment may also include controlling, using the voltage set point signal, a switch coupled between the bus power supply and the clamped power supply 806. Operations may further include generating, using the switch a switch, a voltage level on the clamped power supply that is less than the voltage set point signal.

While FIG. 8 illustrates various operations according to one embodiment, it is to be understood that in not all of these operations are necessary. Indeed, it is fully contemplated herein that in other embodiments of the present disclosure, the operations depicted in FIG. 8 may be combined in a manner not specifically shown in any of the drawings, but still fully consistent with the present disclosure. Thus, claims directed to features and/or operations that are not exactly shown in one drawing are deemed within the scope and content of the present disclosure. In addition, "circuitry" or "circuit", as used in any embodiment herein, may comprise, for example, singly or in any combination, hardwired circuitry, programmable circuitry, state machine circuitry, and/or circuitry available in a larger system, for example, discrete elements that may be included as part of an integrated circuit. In addition, any of the switch devices described herein (e.g., switch 106, 402, 504, etc.) may include any type of known or after-developed switch circuitry such as, for example, MOS transistor, BJT, etc.

Advantageously, a power supply system according to various teachings of the present disclosure may provides a clamped internal power supply that reduces or eliminates over voltage conditions on an input power supply, thus eliminating the need for separate over voltage protection circuitry. Also advantageously, the power supply system according to the teachings herein may generate the clamped power supply in a self-sustaining manner, i.e., without input from external sources/signals. Thus, for example, the power supply system may generate the clamped power supply without the need for input from the digital core of an IC, thus reducing the load on the digital core and reducing the complexity of the power conditioning stage of the IC, and enabling the use of the power supply system of the present disclosure in the absence of a digital core. In addition, the high voltage tolerant switch device of the present disclosure is controlled by a voltage set point signal that is independent of the input power supply (e.g., independent of a bus voltage) so that a clamped power supply derived from the switch remains highly compliant to over voltage clamping requirements. Additional advantages of the power supply system include reduced current consumption and a clamped power supply that is less affected by current consumption than conventional over voltage protection systems.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A power supply system, comprising:
    clamp circuitry configured to receive a bus power supply during a ramp up period of the bus power supply, the clamp circuitry is configured to generate a clamped power supply having a voltage that is based on a voltage of the bus power supply, the clamp circuitry is further configured to clamp an over voltage present on the bus power supply;
    charge pump circuitry configured to generate a voltage set point signal that is independent of the bus power supply, the voltage set point signal is indicative of a predetermined voltage level on the clamped power supply; and
    switch circuitry coupled between the bus power supply and the clamped power supply, the switch circuitry is configured to be controlled by the voltage set point signal, and further configured to generate a voltage level on the clamped power supply that is less than the voltage set point signal.

2. The power supply system of claim 1, wherein the switch circuitry is further configured to clamp voltage levels on the bus power supply that are greater than the voltage set point signal.

3. The power supply system of claim 1, further comprising regulator circuitry configured to generate a regulated power supply, based on the clamped power supply and independent of the bus power supply; wherein the charge pump circuitry is further configured to generate the voltage set point signal based on the regulated power supply.

4. The power supply system of claim 3, wherein the charge pump circuitry is configured to generate the voltage set point signal by level shifting the regulated power supply.

5. The power supply system of claim 1, further comprising bus detection circuitry configured to detect a voltage level on the bus power supply and generate a control signal indicative of whether the bus power supply is in the ramp up period or a fully on period; wherein the charge pump circuitry is further configured to generate the voltage set point signal based on the control signal.

6. The power supply of claim 5, further comprising translator circuitry configured to translate the voltage of the control signal to a voltage that is approximately equal to the voltage of the clamped power supply.

7. The power supply of claim 1, wherein the switch circuitry comprising a high voltage NMOS transistor coupled between the bus power supply and the clamped power supply in a source follower configuration; wherein a source voltage of the NMOS transistor is limited to the gate voltage of the NMOS transistor, supplied by the voltage set point signal, minus a voltage threshold of the NMOS transistor.

8. The power supply of claim 1, wherein the clamp circuitry and the switch circuitry are coupled in parallel to the bus power supply, and wherein during a fully on period of the bus power supply a conduction state of the switch circuitry is controlled by the voltage set point signal to limit the voltage on the clamped power supply.

9. The power supply of claim 1, wherein the clamp circuitry comprising high voltage tolerant switch circuitry coupled between the bus power supply and the clamped power supply and control circuitry configured to generate a reference voltage to control the high voltage tolerant switch circuitry so that, during the ramp up period of the bus power supply, the clamped power supply is based on a threshold voltage of the high voltage tolerant switch circuitry and the reference voltage.

10. The power supply of claim 9, wherein the control circuitry includes a reference current source and at least one diode coupled to the bus power supply and configured to generate the reference voltage signal having a voltage value that, during the ramp up period, controls the high voltage tolerant switch circuitry to operate in a saturation mode.

11. The power supply of claim 5, wherein the charge pump circuitry comprising oscillator circuitry and voltage multiplier circuitry; wherein the oscillator circuitry is configured to be enabled by the control signal and to generate a clock pulse signal, and the multiplier circuitry is configured to increase the voltage of the regulated power supply, based on the clock pulse signal, to generate the voltage set point signal.

12. The power supply of claim 3, wherein the regulator circuitry comprising bandgap reference voltage circuitry configured to generate a bandgap reference voltage, amplifier circuitry configured to receive the bandgap reference voltage and switch circuitry coupled to the clamped power supply and to the input of the amplifier circuitry; wherein the switch circuitry is controlled by the amplifier circuitry so that the switch circuitry operates in a linear mode and wherein the switch circuitry is configured to generate the regulated power supply.

13. The power supply of claim 1, wherein the bus detection circuitry comprising comparator circuitry configured to compare the bus power supply with a reference voltage; wherein the amplifier circuitry is configured to generate a first control signal if the bus power supply exceeds the reference voltage and a second control signal if the bus power supply is less than the reference voltage.

14. A method, comprising:
generating, during a ramp up period of a bus power supply, a clamped power supply based on the bus power supply;
generating a voltage set point signal that is independent of the bus power supply, where the voltage set point signal is indicative of a predetermined voltage level on the clamped power supply;
controlling, using the voltage set point signal, a switch coupled between the bus power supply and the clamped power supply; and
generating, using a switch, a voltage level on the clamped power supply that is less than the voltage set point signal.

15. The method of claim 14, further comprising:
clamping, using the switch, voltage levels on the bus power supply that are greater than the voltage set point signal.

16. The method of claim 14, further comprising:
generating a regulated power supply, based on and independent of, the bus power supply, and generating the voltage set point signal by level shifting the regulated power supply.

17. The method of claim 14, wherein:
the switch comprising a high voltage NMOS transistor coupled between the bus power supply and the clamped power supply in a source follower configuration; and wherein a source voltage of the NMOS transistor is limited to the gate voltage of the NMOS transistor, supplied by the voltage set point signal, minus a voltage threshold of the NMOS transistor.

18. The power supply of claim 14, further comprising:
controlling a conduction state of the switch by the voltage set point signal to limit, during a fully on period of the bus power supply, the voltage on the clamped power supply.

* * * * *